Figure 8:
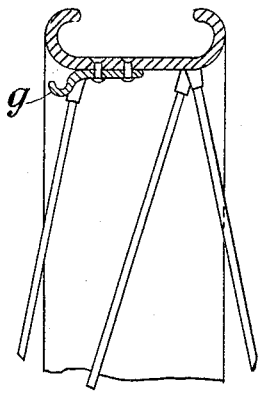

R. BARNFATHER.
MEANS FOR ATTACHING A TIRE INFLATING DEVICE TO A ROAD VEHICLE WHEEL.
APPLICATION FILED MAY 23, 1914.
1,108,827.
Patented Aug. 25, 1914.
2 SHEETS—SHEET 1.
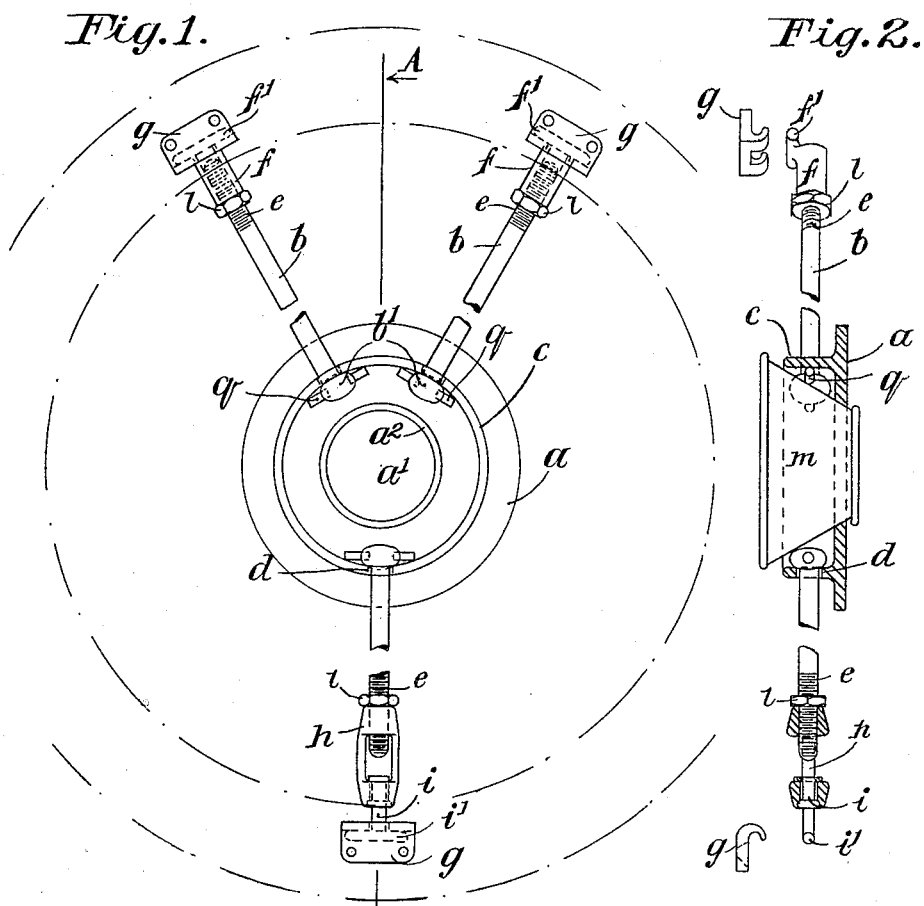
  
 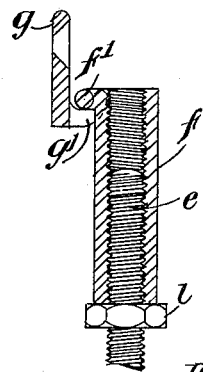 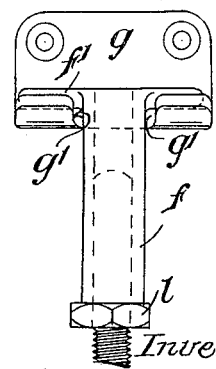

R. BARNFATHER.
MEANS FOR ATTACHING A TIRE INFLATING DEVICE TO A ROAD VEHICLE WHEEL.
APPLICATION FILED MAY 23, 1914.

1,108,827.

Patented Aug. 25, 1914.
2 SHEETS—SHEET 2.

Witnesses.
C. W. Fowler
G. Manning

Inventor.
Robert Barnfather.
By T. Walter Fowler
his atty.

al
UNITED STATES PATENT OFFICE.

ROBERT BARNFATHER, OF HAMMERSMITH, LONDON, ENGLAND.

MEANS FOR ATTACHING A TIRE-INFLATING DEVICE TO A ROAD-VEHICLE WHEEL.

1,108,827.

Specification of Letters Patent.  Patented Aug. 25, 1914.

Application filed May 22, 1914. Serial No. 840,651.

*To all whom it may concern:*

Be it known that I, ROBERT BARNFATHER, a subject of the King of England, and residing at Hammersmith, London, England, have invented certain new and useful Improvements in Means for Attaching Tire-Inflating Devices to Road-Vehicle Wheels, of which the following is a specification.

This invention has reference to improved means for attaching to a road vehicle wheel in a detachable manner a tire-inflating device of the kind which is operated by the rotation of the said road wheel so as to pump air into a leaking, deflated or damaged tire. Inflating devices of this kind are described in my prior Patent Specification No. 972050 and in the specification of my pending application, Serial No. 787676 filed September 2nd 1913.

Hitherto these tire-inflating apparatus have been attached to the hub or to the spokes of the vehicle wheel. According to the present invention I support the frame carrying the pumping mechanism, from the rim or felly of the wheel by direct connections between the frame and the rim or felly. I propose to employ arms which are jointed, hinged, socketed or otherwise secured, preferably in a pivotal manner, at their inner ends to the aforesaid frame and at their outer ends are detachably or removably anchored to the rim or felly. These arms are with advantage made adjustable as to length and the anchoring means may take, for example, the form of hooks or claws, riveted or similarly secured to the rim, or these anchoring means may utilize the existing security bolts of the tire or transverse bolts in the case, for instance, of the well known Michelin detachable rim.

Preferably I employ only three arms, two of these being arranged comparatively close together and the third acting in opposition to the other two, so that the frame can be rapidly mounted and tensioned in position.

By means of this invention the attachment of the inflating device in position is made in a simpler and more positive manner and is unaffected by centrifugal action due to the rapid rotation of the road wheel. Moreover there is obtained an attachment which is more easily and expeditiously secured in place or removed, without preventing access to the wheel hub or hub-cap, and better adapted to support the pumping device in its operative position, viz. at the side of the wheel and around the hub-cap without connection to the latter.

I may also, if desired, provide the frame with a centering cone or funnel to guide the frame over the hub or hub cap when it is being secured in place.

The present invention is hereafter described with reference to the annexed drawings, in which:—

Figure 9:
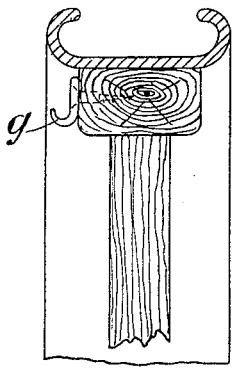
Figure 10:
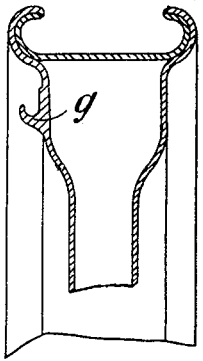
Figure 11:
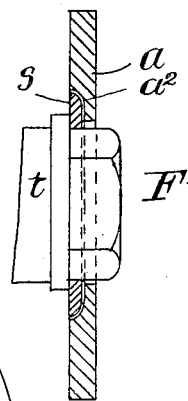
Figure 12:
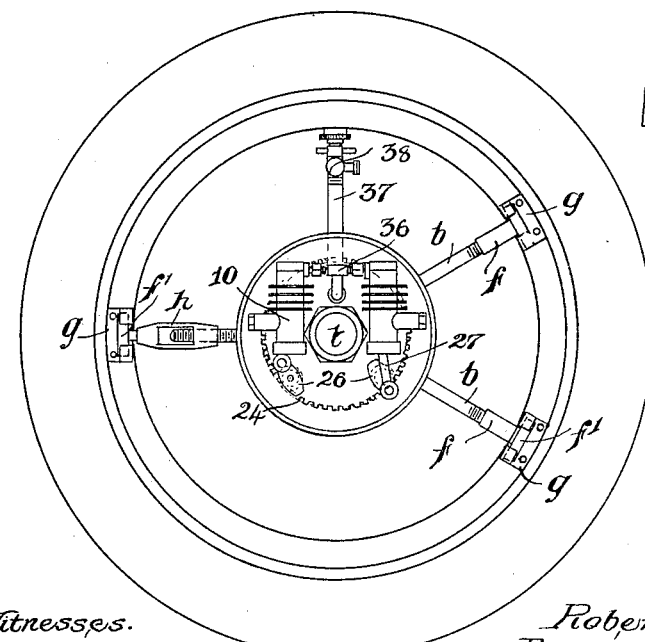

Figure 1 is an elevation of the frame fitted with three arms and seen from the rear or inner side. Fig. 2 is a sectional elevation of Fig. 1 on line A—A. Figs. 3, 4 and 5 are on a larger scale and of these Figs. 3 and 4 show a duplex claw device, while Fig. 5 is a sectional elevation showing the duplex claw device engaged by the arm-fitted sleeve. Figs. 6 and 7 show a modified form in which the inner end of the arm is hinged or journaled to the frame or base plate. Figs. 8, 9 and 10 are cross sections representing types of wheels fitted with claw devices. Fig. 11 is a part section on a larger scale showing the dust excluding device. Fig. 12 shows a road wheel fitted with the pumping arrangement secured in position by means of the three point attachment, the cover plate being removed.

The central frame is indicated at $a$ on which are supposed to be mounted the pumping devices and the connection to the valve of the tire of the road wheel. For a fuller description of these pumping devices I refer to the specification of my pending application Serial No. 787676 filed September 2nd 1913. The pump cylinders are shown in Fig. 12 at 10, the piston rods at 27, cranks 26 and toothed gearing 24; 36 is the union for the compressed air pipe 37 leading to the tire valve 38.

The frame $a$ has a cut out central portion $a^1$ through which the hub cap of the wheel may pass and is preferably provided with a counterbore $a^2$. The frame is provided at its rear (that is the side nearer the plane of the wheel) with an outstanding flange $c$ and this flange is perforated at $d$ to allow the passage therethrough of the three arms $b$. The latter are provided with ball or knob heads $b^1$ which prevent the arms from being drawn wholly through the perforations $d$. These heads may, as shown, have projecting pins $q$ to prevent the rotation of the arms.

The arms $b$ are arranged not equidistantly around the wheel but two of them are comparatively close together so that these two act in opposition to the third arm.

The arms $b$ are screw-threaded on their outer extremities as at $e$, and the two arms which are closer together are shown provided with sleeves or nuts $f$ having trunnions or wings $f^1$ adapted to be engaged by a duplex out-turned claw device $g$ which is riveted or otherwise attached to the rim or felly of the wheel: see Figs. 8, 9 and 10. The claw device is clearly shown in Figs. 3 and 4 with the cut-away middle portion $g^1$ for the passage of the screw-threaded part $e$. The third arm is shown fitted with a tensioning or contractible device $h$ adapted to be screwed upon the extremity $e$ and having at its outer end a swiveling or freely rotatable head $i$ fitted with cross-bars, trunnions or wings $i^1$ whereby it may be engaged with a third duplex claw device $g$.

The screwed sleeves or nuts $f$ of the two juxtaposed arms $b$ having been adjusted and engaged with their claw devices $g\ g$ so that the cross bars $f^1$ lie snugly in the two duplex claw devices $g$, the swiveling head $i$ of the tensioning device is engaged with its claw device $g$ and by means of the device $h$ the three-point attachment may be tensioned and fixed in place upon the wheel.

The screw-threaded portions $e$ of the arms $b$ are shown provided with locking nuts $l$.

It is to be noted that by means of the tensioning device $h$ and the adjustable sleeves or nuts $f$ the device can be fitted to rims or fellies of slightly different diameters.

In Figs. 8, 9 and 10 I have shown the claw $g$ secured to respectively a wire wheel, a wooden wheel, and a steel wheel.

The claw device may be fastened by screws, riveted or otherwise secured to the rim or felly of the wheel and it is shaped to fit the rim or felly according to the type and size of rim or felly to which it is applied. Different forms of rims and wheels are shown by way of example in Figs. 8, 9 and 10.

It is to be understood that if desired each of the arms $b$ may be fitted with a tensioning device such as $h$.

In order to prevent the ball-headed arms falling back through flange $c$ when the attachment is removed from the wheel, a guiding cone $m$ may be employed. This cone $m$ is riveted or otherwise attached to the frame $a$ and is shown continued for a small distance through the central aperture $a^1$ in the frame $a$. It serves to assist in passing the frame over the hub or hub cap of the road wheel and in centering the frame in position, as well as acting as a stop to the ball heads $b^1$ to prevent the inner ends of the arms from being drawn back too far.

In another form of the invention, as shown in Figs. 6 and 7, the arms $b$ may be secured to the frame by hinged or pivoted connections such for instance as U-shaped brackets $o$ upstanding from plates $o^1$ riveted or otherwise mounted on the frame and having cross-pins or pivotal bolts $p$ passing through the inner ends of the arms and the brackets $o$. In this case the perforated flange $c$ may be dispensed with.

Where the arms are thus hinged or pivoted to the frame they can be folded over and the total length thus reduced when the device is removed from the wheel; and where (as shown in Figs. 1 and 2) the ball-head arrangement $b^1$ is used the fixing of the arms $b$ to the claws and their engagement therewith, is facilitated since the arms are permitted a slight lateral movement at their extremities.

At $s$ in Fig. 11 I have shown a packing piece or washer of aluminium or other similar material fitted around the hub cap $t$ of the wheel so as to exclude dust and the like from the pumping mechanism. The washer $s$ is curved on its outer periphery to correspond with the counterbore $a^2$.

I wish it to be understood that by the expression "jointed" in the description and claims, I mean pivoted, hinged, knuckled or provided with a ball and socket joint, for obviously the inner ends of the arms may be secured to the frame in accordance with this invention in various ways.

Having thus described my invention what I claim as such and desire to secure by Letters Patent is:—

1. Means for attaching a tire-inflating device to a road vehicle wheel, comprising a frame having pumping devices mounted thereon, arms secured at their inner ends to said frame, said arms extending outwardly toward the rim of the said wheel, the outer ends of said arms being provided with adjustable engaging devices, and means carried by said rim or felly whereby said devices may be engaged with said means so that the said frame is directly supported from the said rim or felly.

2. Means for attaching a tire-inflating device to a road vehicle wheel, comprising a frame having pumping devices mounted thereon, arms jointed at their inner ends to said frame, said arms extending outwardly to the rim of said wheel with their outer ends screw-threaded, nuts upon said screw-threaded ends and means carried by said nuts whereby said nuts may be connected to the rim or felly of said wheel.

3. Means for attaching a tire-inflating device to a road vehicle wheel, comprising a frame having pumping devices mounted thereon, arms jointed at their inner ends to said frame, said arms extending outwardly to the rim of said wheel, and having their outer ends screw-threaded, nuts upon said screw-threaded ends, lateral projections from said nuts, and claw devices fixed on the rim of said wheel adapted to be engaged by said lateral projections.

4. Means for attaching a tire-inflating device to a road vehicle wheel, comprising a frame, pumping devices mounted thereon, a flange upon said frame, perforations in said flange, arms passed through said perforations and having heads seated on the inner side of said flange, said arms being three in number and arranged two close together so that these two act in opposition to the third, and means for engaging the outer ends of said arms with the rim or felly of the said wheel.

5. Means for attaching a tire-inflating device to a road vehicle wheel, comprising a frame having pumping devices mounted thereon, arms jointed at their inner ends to said frame, said arms extending outwardly to the rim of said wheel and said arms at their outer ends being screw-threaded, nuts upon said screw-threaded ends, one of said nuts comprising a tensioning device, and attachments to said nuts whereby said nuts may be locked to the rim of said wheel.

6. Means for attaching a tire-inflating device to a road vehicle wheel, comprising a frame, pumping devices mounted thereon, a flange upon said frame, perforations in said frame, arms passed through said perforations and having heads seated on the inner side of said flange, said arms being three in number and arranged two close together so that these two act in opposition to the third, a guiding cone secured to said frame, said cone serving to center the frame over the hub of the wheel and to act as a stop for the heads of said arms, and means for connecting the outer ends of said arms with the rim or felly of the wheel.

7. Means for attaching a tire-inflating device to a road vehicle wheel, comprising a frame having pumping devices mounted thereon, arms jointed at their inner ends to said frame, said arms extending outwardly toward the rim of said wheel and having screw-threaded outer extremities, nuts mounted on said screwed extremities, claw devices secured upon the rim of said wheel and means carried by said nuts for engaging said claw devices.

8. Means for attaching a tire-inflating device to a road vehicle wheel, comprising a frame having pumping devices mounted thereon, arms jointed at their inner ends to said frame, said arms extending outwardly toward the rim of said wheel and having screw-threaded outer extremities, nuts mounted on said screwed extremities, cross members carried by said nuts and a duplex claw device for each arm secured to said rim, said claw devices having each a cutaway central portion and an outwardly curved hook portion, said cross members engaging said duplex claw devices.

9. Means for attaching a tire-inflating device to a road vehicle wheel, comprising a frame, three arms having heads at their inner ends whereby said arms may be jointed direct to said frame, said arms being arranged two close together so as to act in opposition to the third arm, means for coupling each of the arms to the rim of the wheel and a tensioning device provided on said third arm whereby the whole attachment may be tensioned in place.

10. Means for attaching a tire-inflating device to a road vehicle wheel, comprising an annular frame, three arms jointed to said frame at their inner ends, said arms arranged two close together so as to act in opposition to the third, means for coupling each of the two closer arms with the rim of the wheel, and a tensioning device provided on the third arm whereby said arm may also be fastened to the rim and the whole attachment tensioned in place.

11. Means for attaching a tire-inflating device to a road vehicle wheel, comprising an annular frame, three arms jointed to said frame at their inner ends, said arms being arranged two close together so as to act in opposition to the third, means for coupling each of the two closer arms to the rim of the wheel, means for coupling the third arm to the rim of the wheel and a contractible device provided on said third arm intermediate between the annular frame and its coupling means.

12. Means for attaching to a road vehicle wheel a tire-inflating device of the kind carried by, and operated by the rotation of, said wheel, in which the frame or base plate carrying the pumping devices is provided with arms preferably jointed, hinged or pivoted thereto, the outer ends of the arms being furnished with means whereby they may be adjusted to and detachably engaged with retaining devices provided upon the rim or felly of the wheel.

13. A three point attachment for a tire-inflating device to a road vehicle wheel, which comprises direct connections from the frame or base plate of the pumping device to the rim or felly of the wheel, said connections being so arranged that one acts in opposition to the other two, and being detachably connected to the said rim or felly.

14. Means for attaching a tire-inflating device to a road vehicle wheel, comprising a frame having pumping devices mounted thereon, said frame having a cut out central portion to fit over the hub of the wheel and said pumping devices being operable by the rotation of the wheel, arms secured at their inner ends to said frame, said arms extending outwardly toward the wheel rim and having their outer ends provided with adjustable engaging devices and means carried by the rim of the wheel whereby said devices may be engaged with said means so that said frame is directly supported from the said rim.

15. Means for attaching a tire-inflating device to a road vehicle wheel, comprising a frame having pumping devices mounted thereon, said frame having a cut out central portion to fit over the hub of the wheel and said pumping devices being operable by the rotation of the wheel, arms secured at their inner ends to said frame, said arms extending outwardly toward the wheel rim and having their outer ends provided with adjustable engaging devices, means carried by the rim of the wheel whereby said devices may be engaged with said means so that said frame is directly supported from the said rim, and a packing washer arranged around the hub cap of the wheel and between said hub cap and the cut out portion of the said frame.

16. Means for attaching a tire-inflating device to a road vehicle wheel, comprising a frame having pumping devices mounted thereon, said frame having a cut out central portion to fit over the hub of the wheel and said pumping devices being operable by the rotation of the wheel, arms secured at their inner ends to said frame, said arms extending outwardly toward the wheel rim and having their outer ends provided with adjustable engaging devices, means carried by the rim of the wheel whereby said devices may be engaged with said means so that said frame is directly supported from the said rim, a packing washer arranged around the hub cap of the wheel and between said hub cap and the cut out portion of the said frame, said frame being counterbored at its center and said washer having a curved periphery to correspond with said counterbore.

In testimony whereof I have affixed my signature in presence of two witnesses.

ROBERT BARNFATHER.

Witnesses:
VICTOR FALLON FEENY,
CYRIL JOSEPH FEENY.